United States Patent [19]

Kondo

[11] Patent Number: 5,453,869
[45] Date of Patent: Sep. 26, 1995

[54] LIGHT DEFLECTING APPARATUS USING A ROTARY POLYGON MIRROR

[75] Inventor: Takao Kondo, Tokyo, Japan

[73] Assignee: Sony Corporation, Tokyo, Japan

[21] Appl. No.: 273,917

[22] Filed: Jul. 12, 1994

[30] Foreign Application Priority Data

Jul. 30, 1993 [JP] Japan ................... 5-208919

[51] Int. Cl.⁶ ................................. G02B 26/08
[52] U.S. Cl. .................. 359/200; 359/198; 384/105; 384/121; 384/461; 310/36
[58] Field of Search ................. 359/200, 198; 384/461, 105, 109, 121, 248, 251; 310/36

[56] References Cited

U.S. PATENT DOCUMENTS 2,951,729  3/1944  Skarstrom ................... 384/105
4,805,972  9/1994  Tanaka et al. ............... 359/200
4,934,781  9/1994  Kato et al. .................. 359/200

Primary Examiner—Paul M. Dzierzynski
Assistant Examiner—Mohammad Y. Sikder
Attorney, Agent, or Firm—Ronald P. Kananen

[57] ABSTRACT

In a light deflecting apparatus including a rotary polygon mirror in which a disc rotary polygon mirror is fixed to a shaft supported by a gas of a predetermined pressure. The rotary polygon mirror is fixed to the circumferential side of a shaft by direct engagement therewith, and compressed air is supplied to the thrust end surface of the rotary polygon mirror, to use the thrust end surface as a thrust bearing. Thereby, the rotary polygon mirror can be rotated with higher running accuracy.

5 Claims, 3 Drawing Sheets

LIGHT DEFLECTING APPARATUS USING A ROTARY POLYGON MIRROR

BACKGROUND OF THE INVENTION

Field of the Invention

This invention relates to a light deflecting apparatus using a rotary polygon mirror, and more particularly, to a light deflecting apparatus using a rotary polygon mirror utilizing a pneumatic bearing.

Description of the Related Art

Heretofore, a light deflecting apparatus using a rotary polygon mirror for reflecting and scanning a light beam in a specified direction by using a rotary polygon mirror (hereinafter, referred to as "polygon mirror"), which has a construction shown in FIG. 1, has been proposed.

That is, in FIG. 1, 1 generally shows the light deflecting apparatus using a rotary polygon mirror. The light deflecting apparatus is composed of a lower block 2, middle block 6, upper block 3, pipe block 4 which is provided between the lower block 2 and the middle block 6, and pipe block 5 which is provided between the middle block 6 and the upper block 3.

At the inner circumference of the middle block 6, an iron core 21 wounded by a magnet wire 28 is provided, and at the inner circumferential surface of the iron core 21, a stator ring 22 made of, for example, ceramic is fixed thereto.

Further, at the inner circumferential surface of the stator ring 22, a rotor ring 23 made of resinous material etc., is engaged freely, being separated by a slight space 25, and at the inner circumferential surface of the rotor ring 23, a shaft 26, which at its circumference a magnet 24 is affixed by engaging, is engaged. Therefore, a rotor unit constituted by the shaft 26, magnet 24, and rotor ring 23 is supported freely in revolution with respect to the inner circumferential surface of the stator ring 22, being separated by the slight space 25.

At the upper end of the shaft 26, a thrust bearing member 37 is fixed with screws 36A and 36B. The thrust bearing member 37 is arranged facing a disc member 31, which is fixed to the pipe block 5, across a slight space.

The thrust bearing member 37 is engaged with a polygon mirror 33 of which its circumferential side is formed by a plurality of mirrors 33A, and held to the shaft 26 with a screw 34 through a fixed disc 35.

On the other hand, at the lower end of the shaft 26, a thrust bearing member 42 is fixed with screws 46A and 46B, and the thrust bearing member 42 is arranged facing a disc member 41 fixed to the pipe block 4 across a slight space.

At the thrust bearing member 42, a disc member 43 weighing as much as the polygon mirror 33 is engaged, and held to the shaft 26 with a screw 44 through a fixed disc 45. Accordingly, the balance is kept by the disc member 43 and the polygon mirror 33, so that the smooth revolution of the shaft 26 can be realized.

In the middle block 6, a path 6A for introducing compressed air is formed, and the compressed air taken from a joint 15 is introduced into a path 21A formed at the iron core 21. Further, the compressed air introduced into the path 21A is supplied to the space 25 formed between the stator ring 22 and the rotor ring 23 through a choke tube formed in the stator ring 22.

In such a manner, compressed air is introduced into the space 25, so that the shaft 26 is supported via a pneumatic layer in the radial direction. The compressed air introduced into the space 25 is exhausted from joints 11 and 13 through paths 4B and 5B formed in the pipe blocks 4 and 5 respectively.

On the other hand, a path 4A for introducing compressed air is formed in the pipe block 4, so that the compressed air taken from a joint 12 is supplied to a space formed between the disc member 41 and the thrust bearing member 42 through the path 4A. By introducing compressed air into the space, the thrust bearing member 42 and the shaft 26 fixed thereto are supported in the thrust direction via the pneumatic layer.

Further, a path 5A for introducing compressed air is formed in the pipe block 5, the compressed air taken from a joint 14 is supplied to a space formed between a disc member 31 and the thrust bearing member 37 through the path 5A. By introducing compressed air into the space, the thrust bearing member 37 and the shaft 26 fixed thereto are supported in the thrust direction via the pneumatic layer.

As described above, the shaft 26 is supported in the radial and thrust directions by the compressed air taken in from the joints 12, 14, and 15. In this state, the drive current is flown to the magnet wire 28, so as to rotate the shaft 26.

At this time, a light beam is irradiated to the mirror surface 33A of the polygon mirror 33 which is fixed to the shaft 26, through an opening 3A, so that the light beam can be reflected and scanned in a specified direction corresponding to the revolution of the polygon mirror 33.

In the light deflecting apparatus using the rotary polygon mirror 1 having the construction, the shaft 26 is rotated at the speed of approximately 60,000 to 80,000 [rpm], thus the part of the radial bearing heats by viscous friction of the air in the space 25. At this time, since the polygon mirror 33 is fixed to the shaft 26 via the thrust bearing member 37, the thermal conducting path from the heating element is complicated, as a result, the thermal expansion amount and the thermal expansion directions with respect to the fitting portion of the polygon mirror 33 become non-uniform, thus, there is a problem that the running accuracy of the mirror surface 33A of the polygon mirror 33 deteriorates.

Further, because the polygon mirror 33 is fixed to the shaft 26 via the thrust bearing member 37, the length of the shaft 26 of the rotor becomes long, and the natural frequency could not be made sufficiently high. As a result, there is a problem that a stable revolution cannot be realized.

SUMMARY OF THE INVENTION

In view of the foregoing, an object of this invention is to provide a light deflecting apparatus using a rotary polygon mirror in which, the rotary polygon mirror can be rotated with higher accuracy.

The foregoing object and other objects of this invention have been achieved by the provision of a light deflecting apparatus using a rotary polygon mirror 50 in which a rotary polygon mirror 71 is fixed to a shaft 66 supported by gas of a predetermined pressure, the rotary polygon mirror 71 being fixed directly to the radial surface 66A of the shaft 66.

Further, in the light deflecting apparatus using the rotary polygon mirror 50 in which the disc rotary polygon mirror 71 is fixed to the shaft 66, which is supported by gas of a predetermined pressure, the gas of a predetermined pressure is supplied from the longitudinal directions of the shaft 66 toward the center position of the shaft 66 in the longitudinal direction, with respect to the thrust end face 71B of the rotary polygon mirror 71, thereby, the rotary polygon mirror 71 is supported in the thrust direction.

Further, in the light deflecting apparatus using the rotary polygon mirror 50 in which the disc rotary polygon mirror 71 is fixed to the shaft 66, which is supported by the gas of a predetermined pressure, the gas of a predetermined pressure is supplied to the thrust end face 71B of the rotary polygon mirror 71, in order to support the rotary polygon mirror 71 in the thrust direction.

As described above, according to this invention, the rotary polygon mirror is fixed to the circumferential side of the shaft by engaging directly therewith, and the compressed air is supplied to the thrust end surface of the rotary polygon mirror, to use the thrust end surface as a thrust bearing, so that the light deflecting apparatus using the rotary polygon mirror in which the rotary polygon mirror can be rotated with higher accuracy can be realized.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
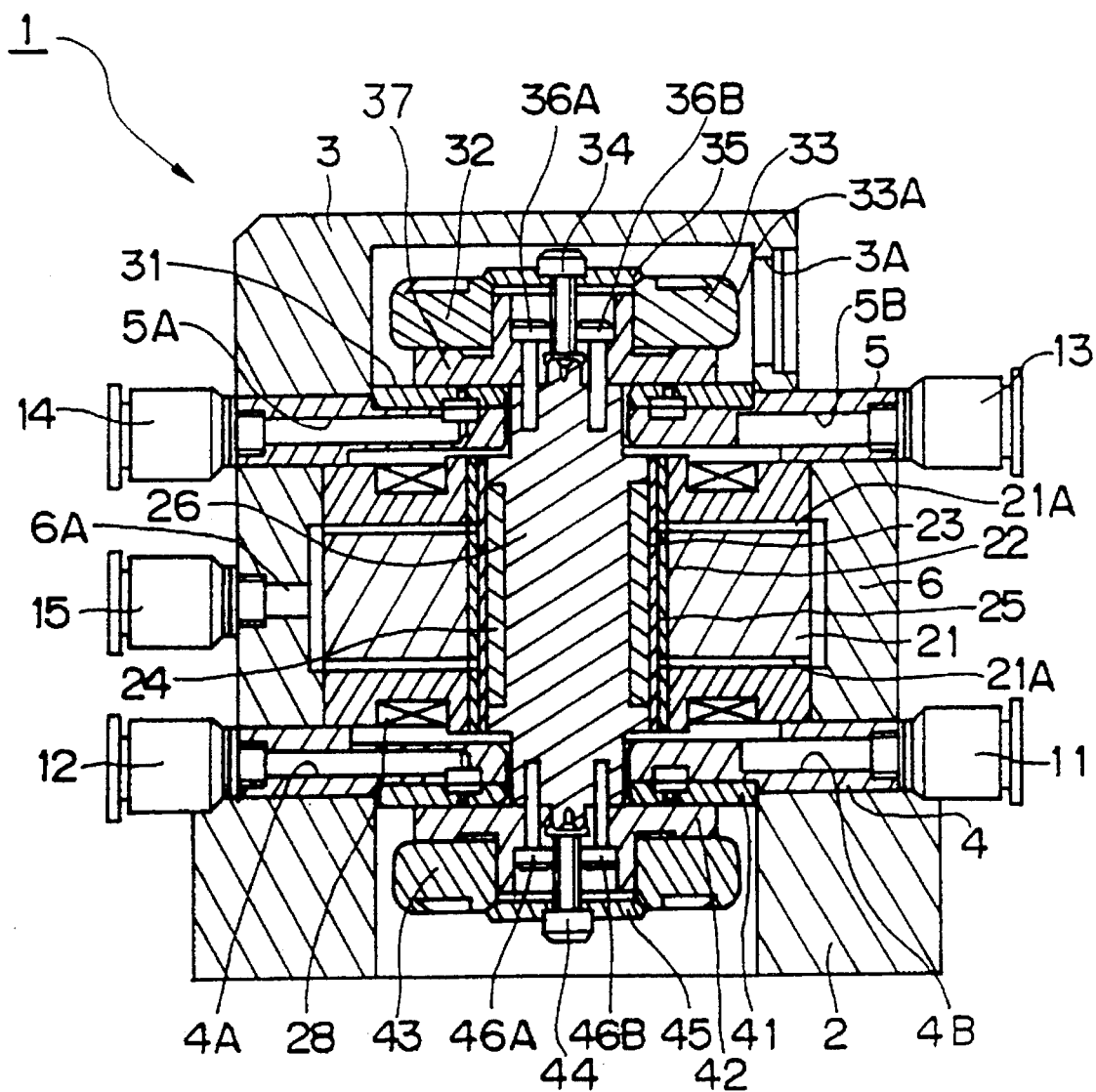
FIG. 1 is a sectional view showing a conventional light deflecting apparatus using a rotary polygon mirror.
Figure 2:
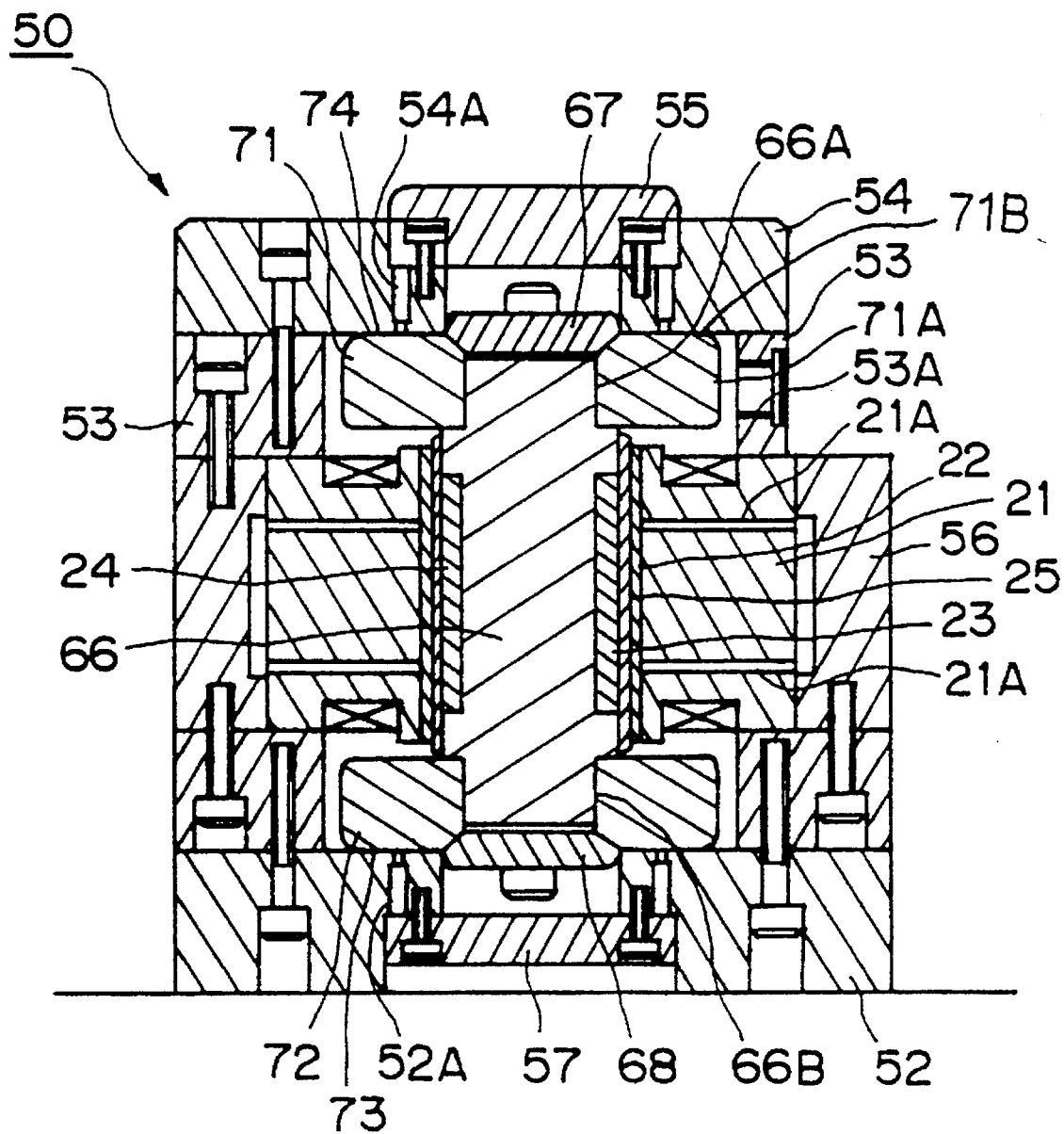
FIG. 2 is a sectional view showing an embodiment of the light deflecting apparatus using the rotary polygon mirror according to this invention.

Preferred embodiments of this invention will be described with reference to the accompanying drawings:

In FIG. 2 in which the same numerals are added to the corresponding part of FIG. 1, the light deflecting apparatus using the rotary polygon mirror 50 is composed of a lower block 52, middle block 56, upper block 54, and box 53 enclosing a polygon mirror 33.

A shaft 66 is supported freely in revolution by utilizing compressed air supplied to a space 25 formed between a rotor ring 23 and a stator ring 22 which are fixed to the circumferential side of the shaft 66, as a radial bearing.

At the circumferential side 66A which is formed at the upper end of the shaft 66, a polygon mirror 71 is engaged directly therewith, and fixed to the shaft 66 by a fixed disc 67. The thrust face of the polygon mirror 71 is arranged against the upper block 54 across a slight space 74.

Further, at the circumferential side 66B which is formed at the lower end of the shaft 66, a disc member 72 which is approximately the same weight as the polygon mirror 71 is directly engaged therewith, and fixed to the shaft 66 by a fixed disc 68. The thrust face of the disc member 72 is arranged against the lower block 52 across a slight space 73.

Here, in the upper block 54, a path 54A for introducing compressed air is formed, so that the compressed air introduced into the path 54A is supplied to the space 74 between the thrust face of the polygon mirror 71 and the upper block 54 through a choke tube.

Accordingly, the polygon mirror 71 is supported in the thrust direction by the compressed air supplied to the space 74.

On the other hand, in the lower block 52, a path 52A for introducing compressed air is formed, so that the compressed air introduced into the path 52A is supplied to the space 73 between the thrust face and the lower block 52 through the choke tube.

Accordingly, the disc member 72 is supported in the thrust direction by the compressed air supplied to the space 73.

In this manner, the shaft 66 is supported in the radial direction by the compressed air supplied to the space 25, and also supported in the thrust direction by the compressed air supplied to the spaces 73 and 74, so as to support freely in revolution as a whole, so that the shaft 66 can be rotated by flowing drive current to a magnet wire wounded to an iron core 21.

Therefore, by irradiating a light beam to a mirror surface 71A of the polygon mirror 71 through an opening 53A of a box 53 in this state, the light beam can be reflected and scanned in a specified direction on the mirror surface 71A.

In the construction, in the light deflecting apparatus using the rotary polygon mirror 50, the polygon mirror 71 is fixed thereto by engaging directly with the circumferential side 66A of the shaft 66. Thereby, the axis length of the shaft 66 can be shortened, compared with the conventional case in which the polygon mirror is fixed to the shaft via the thrust bearing member 37 (FIG. 1).

Further, the compressed air is supplied from the end of the shaft 66 in the longitudinal direction toward the center portion of the axis line of the shaft 66, so that it can be avoided to arrange the pipe block 5 (FIG. 1) between the iron core 21 and the polygon mirror, compared with the conventional case in which the compressed air is supplied from the center portion of the longitudinal direction of the shaft 26 toward the end of the longitudinal direction. Thereby, the axis length of the shaft 66 can be shortened.

According to the above construction, the axis length of the shaft 66 can be shortened, thus, the natural frequency becomes high. Thereby, a fixed revolution can be realized depending on the high-rigidity.

Further, the polygon mirror 71 is fixed to the shaft 66 by engaging directly therewith, thus, the number of parts in the fixing unit can be reduced, so that the thermal conducting path for the heat generated in the space 25 which is provided as a radial bearing, can be simplified. Therefore, the thermal expansion amount and the expansion directions can be equalized as a whole, and the generation of complicated strains in the rotary unit can be avoided. Accordingly, the deterioration of the running accuracy of the mirror surface 71A of the polygon mirror 71 can be avoided even at high temperatures.

Further, in this case, since the thrust bearing member 37 (FIG. 1) can be reduced, the accumulation of the parts error can be reduced, thus the running accuracy of the polygon mirror 71 can be improved.

Further, the compressed air is directly supplied to the thrust face of the polygon mirror 71 to utilize the thrust face as a thrust bearing, thus the running accuracy of the mirror surface 71A of the polygon mirror 71 can be improved.

Figure 3:
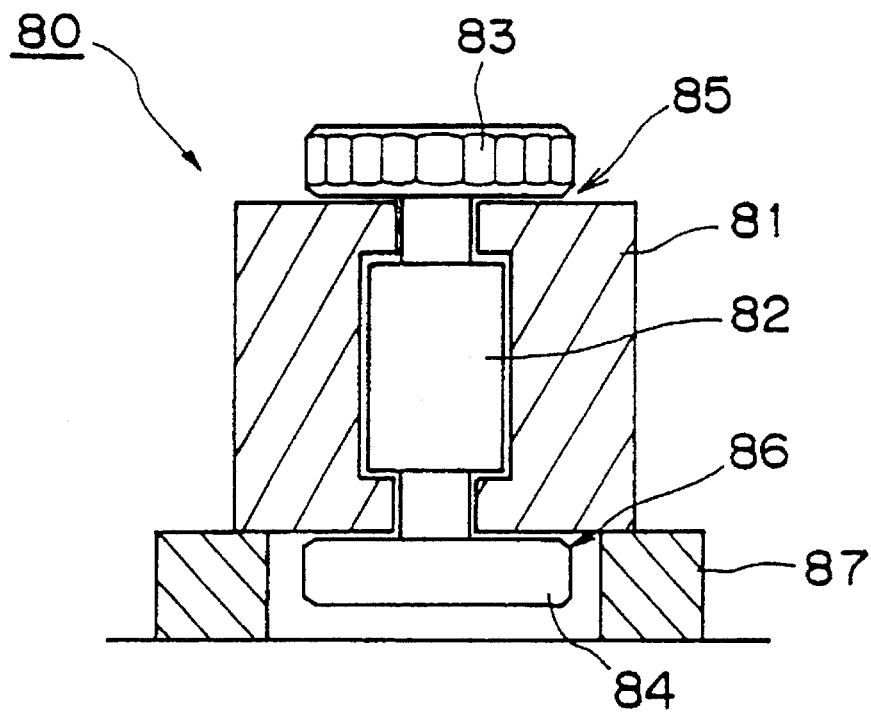
FIGS. 3 and 4 are schematic diagrams showing another embodiment.

In the embodiment described above, the compressed air with respect to the polygon mirror 71 is supplied from the end portion of the shaft 66 in the longitudinal direction toward the center portion of the axis line of the shaft 66. However, this invention is not only limited to this, but for example, as shown in FIG. 3, when supplying the compressed air from the box block 81 to the polygon mirror 83, the compressed air to be sent from the center of the axis line of the shaft 82 in the longitudinal direction toward the end of the shaft 82 in the longitudinal direction, may be supplied from the path (not shown) of the box block 81, to utilize the compressed air supplied to the space 85, which is formed between the box block 81 and the thrust face of the polygon mirror 83, as a thrust bearing. Thereby, the same effects as the case described above can be obtained, in the aspect that the compressed air can be directly supplied to the thrust face of the polygon mirror 83, and the thrust bearing member 37 (FIG. 1) can be reduced by fixing the polygon mirror 83 directly to the shaft 82.

Figure 4:
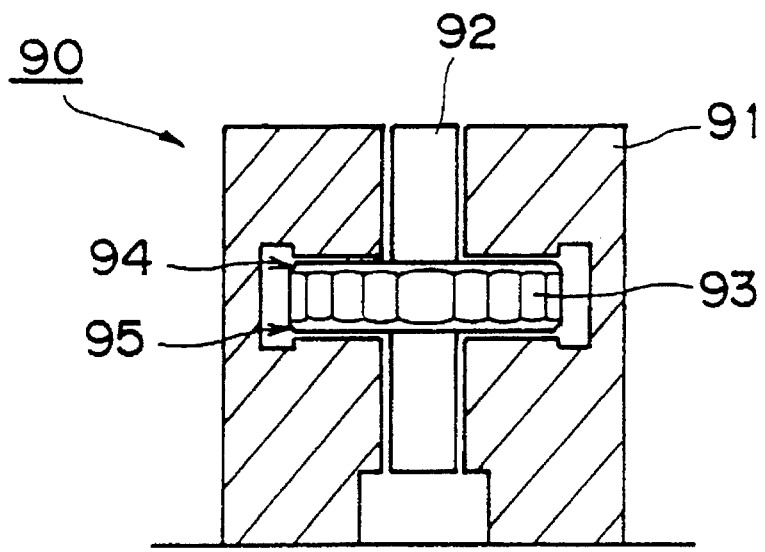

Further, on the contrary, as shown in FIG. 4, the polygon mirror 93 may be arranged at the center portion of the box block 91, to have the compressed air supplied to the spaces 94 and 95 which are formed respectively between the upper thrust face of the polygon mirror 93 and the box block 91, and between the lower thrust face of the polygon mirror 93 and the box block 91. Thereby, the same effects as the embodiments described above can be obtained.

Further, in the embodiments described above, the light deflecting apparatus using the rotary polygon mirror utilizes the bearing of static pressure type in which the compressed air is supplied from an external unit. However, this invention is not only limited to this, but may be applied to a light deflecting apparatus using a rotary polygon mirror utilizing a bearing of dynamic pressure type in which an air layer at a predetermined pressure is formed by revolution.

Furthermore, in the embodiments described above, compressed air is utilized as a medium of the gas bearing. However, this invention is not only limited to this, but may use various gas other than the air.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A light deflecting apparatus comprising a disc shaped polygon mirror having a thrust end face and an opposite face, and a shaft arranged to rotate about an axis, said polygon mirror being fixed to said shaft and supported for rotation thereon by a gas of a predetermined pressure, and at least a portion of said shaft being enclosed within said apparatus to define a radial bearing, said apparatus further comprising:

means for supplying the gas of a first predetermined pressure along said shaft in the direction of the axis thereof toward the thrust end face of said disc-shaped polygon mirror whereby said polygon mirror is supported during rotation in its thrust direction by said gas acting against said thrust end face and means for supplying gas of a second predetermined pressure along said shaft in the direction of the axis thereof through said radial bearing and toward the opposite face of said disc-shaped polygon mirror whereby said shaft is supported during rotation in its radial direction.

2. A light deflecting apparatus including a disc shaped polygon mirror having a thrust end face, and a shaft arranged to rotate about an axis, said polygon mirror being directly fixed to a radial surface of said shaft and supported for rotation thereon by a gas of a predetermined pressure, wherein, the gas of a predetermined pressure is supplied to the thrust end face of said polygon mirror to thereby support said polygon mirror during rotation thereof in its thrust direction.

3. The light deflecting apparatus according to claim 2 further comprising a path for introducing said gas of a predetermined pressure directly against the thrust end face of said disc-shaped polygon mirror.

4. The light deflecting apparatus according to claim 3 further comprising a path for introducing said gas of a predetermined pressure directly against the thrust end face of said disc-shaped polygon mirror.

5. The light deflecting apparatus according to claim 2, wherein said first predetermined pressure and said second predetermined pressure are the same.

* * * * *